(12) United States Patent
Ohlemeyer et al.

(10) Patent No.: US 6,370,852 B1
(45) Date of Patent: Apr. 16, 2002

(54) ARRANGEMENT FOR THE STORAGE OF DATA SPECIFIC TO A BALE

(75) Inventors: Heinrich Ohlemeyer, Hille; Georg Kormann, Freising, both of (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/703,119

(22) Filed: Oct. 31, 2000

(51) Int. Cl.⁷ ................................................. A01F 15/04
(52) U.S. Cl. ..................................... 56/10.2 R; 100/41
(58) Field of Search .................... 56/1, 10.2 R, 16.4 B, 56/341, 377, 370, DIG. 2; 100/99, 35, 45, 189, 41, 43, 88; 460/116, 119

(56) References Cited

U.S. PATENT DOCUMENTS

| | | | |
|---|---|---|---|
| 4,930,411 A | * | 6/1990 | Naaktgeboren ................ 100/4 |
| 5,226,356 A | * | 7/1993 | Schrag et al. ................. 100/41 |
| 6,026,741 A | * | 2/2000 | Lippens et al. ............... 100/41 |

FOREIGN PATENT DOCUMENTS

| | | |
|---|---|---|
| DE | 32 32 746 | 3/1984 |
| DE | 195 43 343 | 5/1997 |

* cited by examiner

*Primary Examiner*—Robert E. Pezzuto

(57) ABSTRACT

A large round baler is equipped with sensors for measuring the location of harvest, and/or various physical characteristics, of crop material being placed in a specific bale, with these parameters being electronically recorded and stored in memory on an electronic storage medium. In order to be able to associate the location and measured values with the individual bale to which the values pertain, a device is provided by which the electronic storage medium may be inserted in, or attached to, the bale.

4 Claims, 3 Drawing Sheets

ARRANGEMENT FOR THE STORAGE OF DATA SPECIFIC TO A BALE

The invention concerns an arrangement for sampling crop and storing data relating to characteristics of the crop and more specifically relates to sampling crop that is being baled and storing the data relating to the characteristics of the crop with the formed bale.

BACKGROUND OF THE INVENTION

DE 195 43 343 A discloses an agricultural baler equipped with sensor technology for the measurement of the load on the operating devices as well as an arrangement for determining the geographic position of the baler at any given time. Furthermore, the mass of the completed bale is weighed. On the basis of the position-dependent measured values from the sensor technology stored in memory and the weighed mass, the mass of the crop taken up is determined as a function of the individual positions. The moisture of the mass of the crop taken up can also be determined as a function of the position. In this way, a yield ticket can be obtained that can be stored, for example, on smart cards, i.e., cards containing a microchip, or on diskettes.

DE 32 32 746 A discloses, in a first embodiment, an agricultural baler in which a moisture measuring arrangement is provided. The moisture measurement is performed, among others, by infra-red light and the result of this measurement can be used to distribute preservatives in properly measured proportions through an appropriate control arrangement over the subsequent path of the harvested crop. If a predetermined limit of moisture is exceeded, the harvested crop can be characterized by means of an appropriate device, for example, by coloring the crop or the yarn binding it or by applying a label.

The problem underlying the invention is seen in the fact that in the state of the art only one method is possible to characterize a bale whose moisture exceeds a certain threshold value. It is not possible to determine other parameters of the individual bales.

SUMMARY OF THE INVENTION

According to the present invention, a novel arrangement is provided on an agricultural baler for acquiring and storing various characteristics of a crop being baled.

An object of the invention is to equip a baler with an arrangement for sampling crop entering the baler, determining at least one characteristic of the crop being baled and to record and store the data relating to the characteristic so that it may be read by an appropriate reading device at the storage location after the bale has been transported off the field.

A more specific object, is to provide a baler equipped as set forth in the immediately preceding object, wherein bale-specific data is stored on an electronic storage medium in analog or, preferably, digital form.

Yet a more specific object is to provide a baler equipped, as set forth in the first object appearing above, wherein the arrangement for sampling the crop takes measurements for determining the mass and/or moisture of the crop and to respectively store these values in mass unit, kilogram, or a moisture content in percent.

Still a more specific object is to provide a baler equipped with a crop sampling arrangement which determines at least one characteristic of the crop being fed to the baling chamber, to store the measured data on an electronic storage medium and to tag the bale formed, containing the stream of crop sampled, with the measured data by either inserting the storage medium into the bale or to fasten the storage medium to the outside of the bale.

These and other objects will become apparent from reading the ensuing description together with the appended drawings.

DESCRIPTION OF THE RELATED ART

Figure 1:
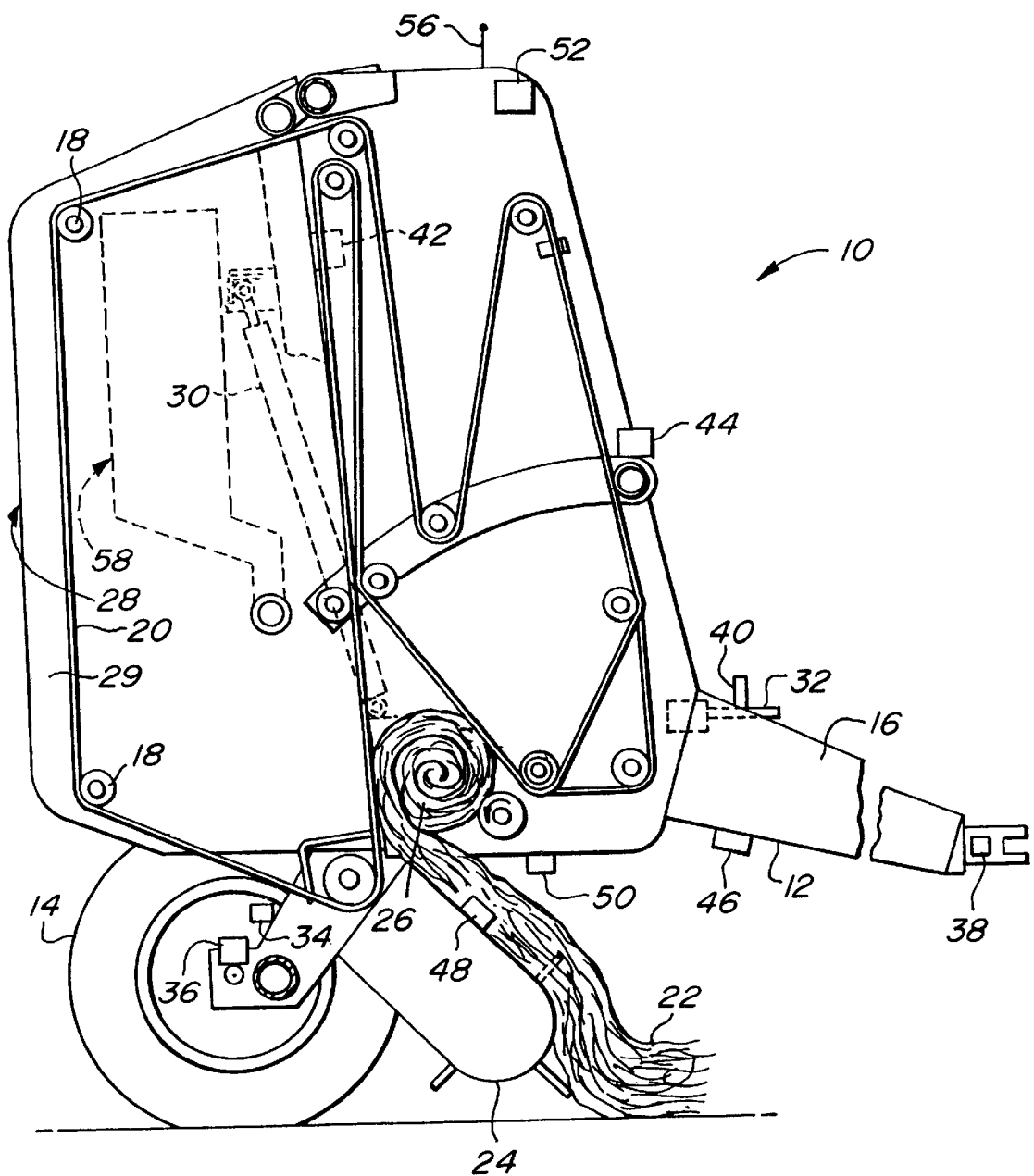
FIG. 1 is a schematic right side view of a baler with parts removed for clarity.

Referring now to FIG. 1, there is shown a baler 10 including a frame 12, that is supported on the ground by wheels 14 and which can be attached to a towing vehicle, not shown, by a tongue 16. Extending between and supported by opposite side walls of the baler 10 are a plurality of bale-forming belt support rolls 18 that arranged to delimit the bounds of an expansible baling chamber defined in part by a plurality of side-by-side mounted, bale-forming belts 20 and into which windrowed crop 22 is taken up and delivered by an intake arrangement 24 for being rolled up into a bale 26. Certainly the baler 10 may also be of a different configuration, for example, a round baler with a fixed baling chamber or even a baler for producing parallelepiped bales could be used.

Once a bale 26 reaches a desired diameter, multiple wraps of twine is placed about its circumference. When the bale 26 has been completely wrapped, a bale discharge gate 28, having opposite side walls 29, is pivoted upward by a pair of hydraulic cylinders 30 (only one shown) so that the completed bale 26 falls out of the baling chamber onto the ground. It would be conceivable to follow the baler 10 with a wrapping implement with which the bale 26 is wrapped with a water-tight foil for the production of silage. Selected ones of the rolls 18 are driven mechanically by a power take-off shaft 32. Since the baler 10 is known in itself, a more detailed description is not necessary.

Figure 2:
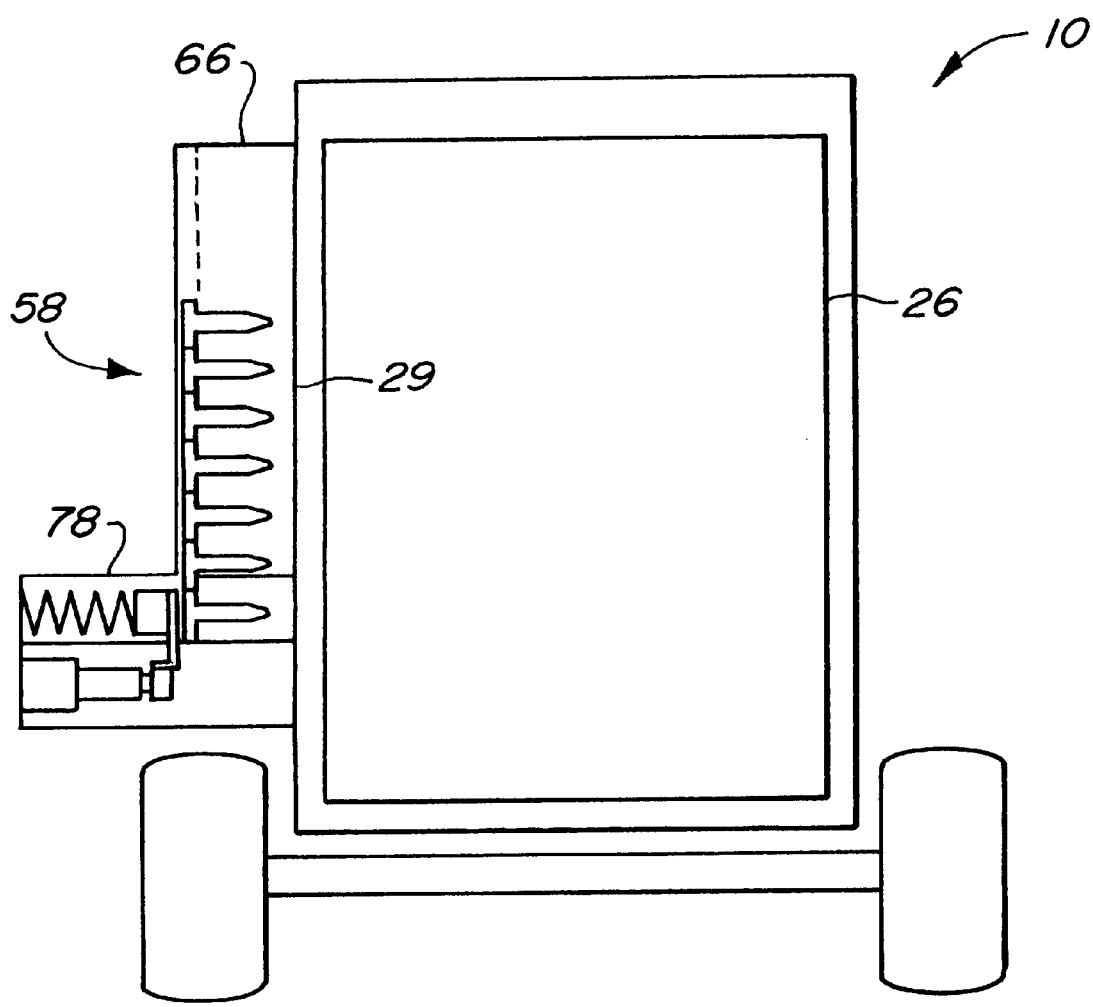
FIG. 2 is a highly schematic rear view of a baler equipped with a device for inserting an electronic storage medium into a bale, with parts removed for clarity.
Figure 3:
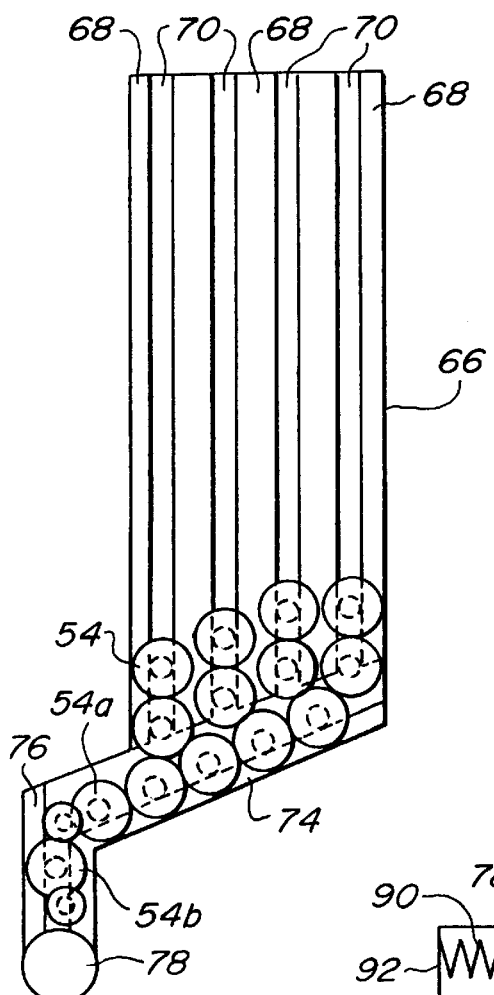
FIG. 3 is a left side view of the magazine for carrying the electronic storage medium chips, but showing the outer side cover removed for clarity.

According to the invention, the baler 10 is equipped with a number of sensors. A first sensor 34 measures the length of the path covered by the baler 10. It detects, for example, the number of revolutions of the wheel 14 by means of a magnetically actuated reed relay. A second sensor 36 is a load cell for the determination of the mass of the bale 26. A third sensor 38 is a force sensor that detects the load on the tongue 16 and is also used as a mass sensor since the load on the tongue 16 is a measure of the mass of the bale 26. A fourth sensor 40 measures the rotational speed of the power take-off shaft 32 that is a measure of the load imposed on the drive of the towing vehicle by the crop processing elements of the baler 10, and contains information on the power required for the formation of the bale 26. A fifth sensor 42 detects whether the baling chamber is closed or has been opened for the discharge of a bale 26. A sixth sensor 44 measures the size of the bale, that is its diameter. A seventh sensor 46 detects whether a wrapping process is taking place. An eighth sensor 48 is arranged at the stream of the flow of the harvested crop 24 taken up and measures the moisture of the crop 24. A ninth sensor 50 determines whether or not any crop 24 at all is being taken up. The aforementioned nine sensors 34 through 50 are connected to a control arrangement 52 in which the measured values are stored temporarily. When the fifth sensor 42 reports that the baling chamber is opened and/or the seventh sensor 46 detects a wrapping process, the control arrangement 52 stores the sensed values measured from the bale 20 formed last from one or more of the sensors 34 through 50 in a transponder chip 54 (FIG. 2), shown here in the shape of a headed spike, but which may be of any shape suitable for being implanted in, or attached to a given bale 26. An antenna 56 connected to the control arrangement 52 is used for this purpose and is positioned in the immediate vicinity of an insertion device 58. Therefore, data are transmitted to the transponder chip 54 by means of the antenna 56 which contains information about the measured values, in particular about several measured values taken one after another of one sensor or an average value, where the energy required by the transponder chip 54 is made available by the antenna 56. After storing the measured values in memory in the transponder chip 54, the insertion device 58 is activated by the control arrangement 52 and the transponder chip 54 is inserted into the bale 20 by the insertion device 58 or is fastened to it, for example, attached to it. The measured values can be read out of the transponder chip 54 again by a reading device 60.

Figure 5:
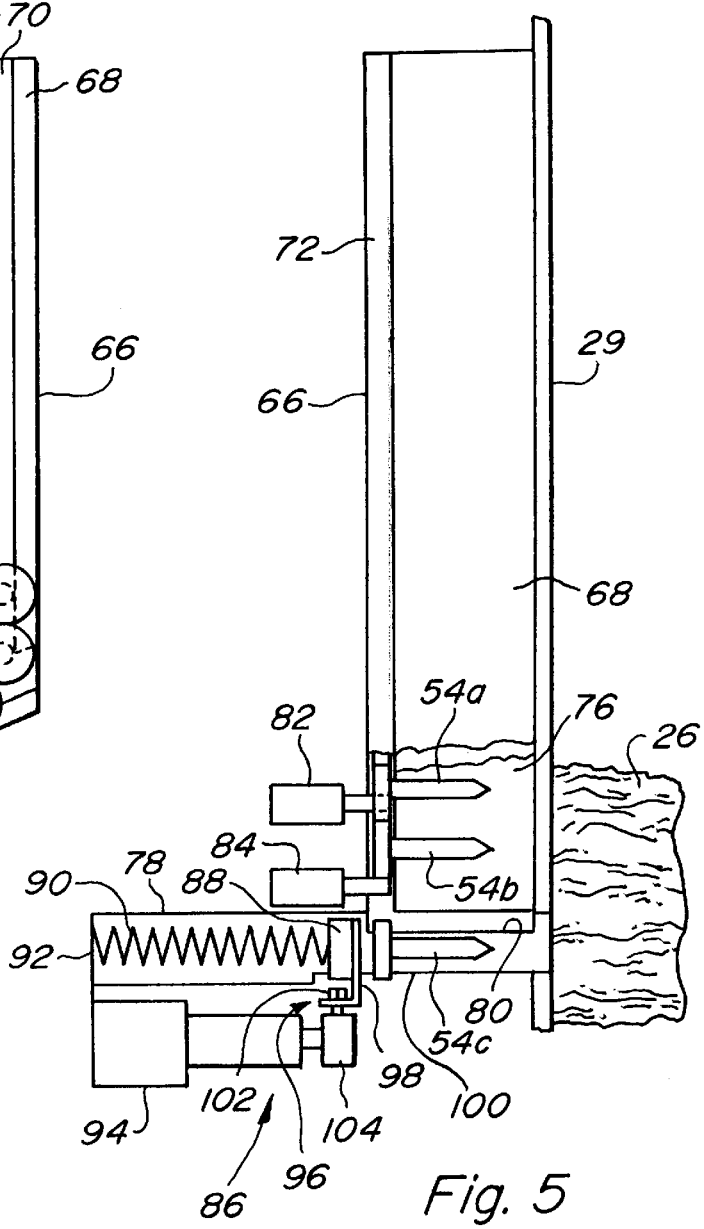
FIG. 5 is a rear view of the magazine shown in FIG. 3, but omitting some of the electronic storage medium chips, but in addition showing the side of the baler to which the magazine is mounted and the mechanism for inserting the chip into the bale.
Figure 4:
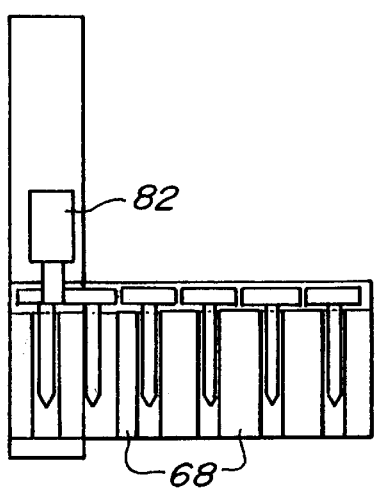
FIG. 4 is a top view of the magazine shown in FIG. 3.

Further details of the insertion device 58 are shown in FIGS. 2 through 5 and include a box-like transponder chip magazine 66 having a plurality of vertical, transversely extending ribs 68 located at longitudinally spaced intervals so as to define a plurality of vertical slots 70 sized to accommodate the stem of a given transponder chip 54 but not its head, the ribs 68 having an outer end spaced inwardly from the outer side of the magazine 66 so as to define a space 72 for receiving the heads of the chips 54. As can best be seen in FIG. 3, lower ends of the ribs 68 are spaced above a bottom wall 74 that slants downward from right to left, the spacing being sufficient to permit the chips 54 to gravitate freely to a vertical, intermediate storage chamber 76 which leads to a metal cylindrical expulsion or discharge tube or chamber 78 having a cut out portion 80 permitting the passage of the transponder chips 54. As shown in FIG. 5, the tube 78 extends through the discharge gate side wall 29 so as to provide access to a given formed bale 26.

For controlling the movement of the transponder chips 54 into the expulsion tube 78 from the intermediate storage chamber 76, there is provided upper and lower locking bolts 82 and 84, respectively, here shown in the form of hydraulic cylinders having extensible and retractable piston rods, but which may be of any suitable construction such as electric screw motors or the like. Both bolts 82 and 84 are shown in their extended condition with the upper bolt 82 blocking a transponder chip 54a from entering the intermediate storage chamber 76 and with the lower bolt 84 preventing movement of a transponder chip 54b into the expulsion or discharge tube or chamber 78. It will be appreciated that the chip 54b is thus in a stand-by position and when it has received and stored bale-specific data, transmitted by the antenna 56, in its memory, the lower bolt 84 will be retracted to permit the chip 54b to fall into the discharge tube 78.

Referring now to FIG. 5, there is shown a ram device 86 for expelling a given transponder chip 54 from the discharge tube 78, a particular chip here being designated as 54c. The ram device 86 includes a sled 88 supported for free sliding movement along the tube 78 by bearings (not shown). A coil spring 90 is located within a left half of the tube 78 and is compressed between the sled 88 and a housing wall 92 closing an outer end of the tube. A linear motor 94, here shown as being electrical, but which maybe in the form of a hydraulic cylinder, is coupled to the sled 88 by a locking mechanism 96 and is arranged for moving the sled 88 so as to load the spring 90. The locking mechanism 96 includes a latch plate 98 having a vertical leg which extends upwardly through a guide slot 100 provided in the bottom of a right half of the tube 78, and a horizontal leg containing an aperture releasably receiving a locking bolt 102 of a second extensible and retractable motor 104 mounted to a free end of an extensible and retractable element of the motor 94. Thus, the locking mechanism can be brought into an operating position, as shown, or a non-operating position by actuation of the second motor 104.

If the locking mechanism 96 is in its operating position, a movement of the sled 88 against the force of the spring 90 is prevented, and the sled 88 is locked in its rest position shown in FIG. 5. The second motor 104 is activated by a corresponding signal after the conclusion of the data transmission to the transponder chip 54c and the baling process. Actuation of the motor 104 results in the locking mechanism 96 being brought into its non-working position with the locking bolt 102 then being withdrawn from the aperture in the latch plate 98. Thus, the sled 88 is released, and, on the basis of the force stored in the spring 90, it accelerates a given transponder chip 54 positioned ahead of the sled 88 in the direction of a given formed bale 20, so that the stem of the spike-like chip 54 is driven into the bale 20. Following this, the motor 94 is actuated so as to extend and move the latch motor 104 into a position where the bolt 102 is aligned with the aperture in the plate 98. The motor 104 is then actuated to extend so that the bolt 102 once again enters the aperture in the latch plate 98. The motor 94 is then actuated so as to retract bringing with it the latch mechanism 96 and the attached sled 88, this movement once again loading the spring 90.

Further transponder chips 54 are made ready in the magazine 66, and can be positioned successively in front of the sled 88 by the force of gravity. In each case, the transponder chip 54 that is located in front of the sled 88 is provided with data by the antenna 58. As discussed above, the upper and lower locking bolts 82 and 84 operate so that only one transponder chip 54 is brought in front of the sled 88.

As a result, an arrangement is obtained that permits the storage in memory and the reading out of measured values specific to a bale. The invention can be applied generally to all agricultural applications in which harvested crop is combined into a bale or bundle.

What is claimed is:

1. In a baler including a bale chamber and a pick up arrangement for delivering crop material to the chamber for being formed into a bale, and at least one sensor for determining a physical characteristic of said crop material and generating a signal representative of said characteristic, the improvement comprising: an electronic device coupled to said sensor for receiving said signal and recording it in memory on an individual, portable electronic storage medium defining a label for each bale; and a labeling device mounted to said baler adjacent said chamber adapted for containing blank labels and for securing a given label to a particular bale once said given label has received and stored said signal representing said characteristic of said particular bale.

2. The baler as defined in claim 1 wherein said blank labels are microchips.

3. The baler as defined in claim 1 wherein said blank labels are transponder chips.

4. The baler as defined in claim 1 wherein said labels are each embodied in a spike-like body having a pointed end; said labeling device including:

(a) a magazine for holding a plurality of said spike-like bodies;

(b) a discharge chamber located adjacent said magazine and having a discharge end in communication with the interior of said bale chamber;

(c) a feeding device associated with said magazine for selectively loading one spike-like body at a time into said discharge chamber;

(d) a propelling arrangement for inserting said given label together with said spike-body into said particular bale.

* * * * *